United States Patent
Black et al.

(10) Patent No.: US 7,133,437 B2
(45) Date of Patent: Nov. 7, 2006

(54) PILOT INTERPOLATION FOR A GATED PILOT WITH COMPENSATION FOR INDUCED PHASE CHANGES

(75) Inventors: Peter J. Black, San Diego, CA (US); Raghu Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 788 days.

(21) Appl. No.: 10/061,824

(22) Filed: Jan. 31, 2002

(65) Prior Publication Data

US 2003/0142734 A1 Jul. 31, 2003

(51) Int. Cl.
*H04B 1/69* (2006.01)
*H04B 7/216* (2006.01)

(52) U.S. Cl. ..................... 375/149; 370/342

(58) Field of Classification Search ............. 375/149, 375/130, 148, 346, 349; 455/65, 303; 370/342, 370/320, 335, 441
See application file for complete search history.

(56) References Cited

U.S. PATENT DOCUMENTS

| | | | |
|---|---|---|---|
| 5,875,215 A | 2/1999 | Dobrica | 375/344 |
| 5,991,330 A | 11/1999 | Dahlman et al. | 375/200 |
| 6,070,086 A | 5/2000 | Dobrica | 455/522 |
| 6,570,909 B1* | 5/2003 | Kansakoski et al. | 375/148 |
| 6,680,727 B1* | 1/2004 | Butler et al. | 375/144 |
| 6,795,488 B1* | 9/2004 | Iwakiri | 375/148 |
| 2003/0072277 A1* | 4/2003 | Subrahmanya et al. | 370/320 |

FOREIGN PATENT DOCUMENTS

| | | |
|---|---|---|
| EP | 0984562 | 8/2000 |
| EP | 1172957 | 1/2002 |
| WO | 0016524 | 3/2000 |
| WO | 0030312 | 5/2000 |
| WO | 0070773 | 11/2000 |

\* cited by examiner

*Primary Examiner*—Khai Tran
(74) *Attorney, Agent, or Firm*—Philip R. Wadsworth; Charles D. Brown; George C. Pappas

(57) ABSTRACT

Techniques for deriving interpolated pilot symbols for a gated pilot in a wireless (e.g., IS-856, cdma2000, or W-CDMA) communication system. In one method, first and second recovered pilot symbols for first and second time instances, respectively, are initially obtained (e.g., derived based on pilot bursts for the gated pilot). A phase change induced in the received signal at a third time instance between the first and second time instances is estimated. First and second phase-rotated symbols are next derived based on the first and second recovered pilot symbols and the estimated induced phase change. Interpolated pilot symbols between the first and third time instances are then derived (e.g., using linear interpolation) based on the first recovered pilot symbol and the first phase-rotated symbol. Similarly, interpolated pilot symbols between the third and second time instances are derived based on the second phase-rotated symbol and the second recovered pilot symbol.

33 Claims, 8 Drawing Sheets

PILOT INTERPOLATION FOR A GATED PILOT WITH COMPENSATION FOR INDUCED PHASE CHANGES

BACKGROUND

1. Field

The present invention relates generally to data communication, and more specifically to techniques for generating a reference signal, comprised of interpolated pilot symbols, for a gated pilot and with compensation for phase changes induced in a received signal.

2. Background

In a typical wireless communication system (e.g., a CDMA system), data is processed, coded, modulated, filtered, amplified, and transmitted from a transmitter unit (e.g., a base station) to one or more receiver units (e.g., terminals). The transmitted signal typically experiences path loss, multipath, and other phenomena prior to reaching the receiver units. At each receiver unit, the transmitted signal is received, conditioned, demodulated, and decoded to recover the transmitted data. The signal conditioning typically includes amplification, filtering, frequency downconversion, and so on.

Due to path loss, multipaths (which may add constructively or destructively), and other phenomena, the received signal strength may vary over a wide range of values. For example, for a CDMA system, the received signal strength can vary over 85 dB. To provide a conditioned signal having the proper amplitude for digitization, multiple stages of low noise amplifier (LNA) and/or variable gain amplifier (VGA) are usually employed in the received signal path from the antenna to the analog-to-digital converters (ADCs). The received signal path may also include one or more sections in which the received signal can be routed through one of several possible signal paths (e.g., a gain path and a bypass path for an LNA stage).

The characteristics of the received signal can change as circuit elements in the received signal path are adjusted and/or as different signal paths are selected. Each circuit element in the received signal path is associated with a particular phase, and each setting of the circuit element may also be associated with a different phase. The received signal can have phase discontinuities if the circuit elements are adjusted in a step-wise fashion (e.g., for a VGA with gain steps) or if the received signal is switched through different signal paths (e.g., the gain and bypassed paths for an LNA stage).

In many wireless communication systems, a pilot is transmitted from each transmitter unit to assist the receiver units perform a number of functions. The pilot is typically generated based on a known data pattern (e.g., a sequence of all zeros) and using a known signal processing scheme (e.g., covered with a known channelization code and spread with a known pseudo-random noise (PN) sequence or scrambling code). The pilot may be used at the receiver units for synchronization with the timing and frequency of the transmitter unit, estimation of the quality of the communication channel, coherent demodulation of a data transmission, and possibly other functions.

Some CDMA systems (e.g., IS-856 and W-CDMA systems) employ a gated pilot transmission scheme. For these systems, the pilot is transmitted in bursts at regular time intervals. At each receiver unit, the pilot bursts are processed to obtain a recovered pilot symbol for each pilot burst, with the recovered pilot symbol being an estimate of the amplitude and phase of the pilot (and thus the communication channel) at a particular time instance. A (continuous) reference signal may then be generated by interpolating the recovered pilot symbols, and this reference signal may be used for data demodulation and other purposes. If phase discontinuities are induced in the received signal due to circuit changes in the received signal path, as described above, then these phase discontinuities need to be accounted for in the reference signal so that data demodulation is not degraded.

There is therefore a need in the art for techniques to generate a reference signal for a gated pilot in a manner to account for phase changes induced in the received signal due to adjustments and/or switching of circuit elements in the received signal path.

SUMMARY

Techniques are provided herein to generate a reference signal for a gated pilot in a manner to account for phase discontinuities induced in the received signal. A receiver unit typically has knowledge of "notable" circuit changes in the received signal path (i.e., changes that may have deleterious effects on performance) and can further have knowledge of the magnitude of the induced phase change due to each notable circuit change. This information can then be used to generate a reference signal having a phase that more closely matches that of a data signal having the induced phase changes. A more accurately generated reference signal may result in improved performance.

In a specific embodiment, a method is provided for deriving interpolated pilot symbols for a gated pilot in a wireless (e.g., IS-856, cdma2000, or W-CDMA) communication system. In accordance with the method, a first recovered pilot symbol for a first time instance and a second recovered pilot symbol for a second time instance are initially obtained (e.g., derived based on pilot bursts received for the gated pilot). A phase change induced in a received signal at a third time instance between the first and second time instances is then estimated. First and second phase-rotated or compensated symbols are next derived (in a manner described below) based on the first and second recovered pilot symbols and the estimated induced phase change. Interpolated pilot symbols between the first and third time instances are then derived (e.g., using linear interpolation) based on the first recovered pilot symbol and the first phase-rotated symbol. Similarly, interpolated pilot symbols between the third and second time instances are derived based on the second phase-rotated symbol and the second recovered pilot symbol.

Various aspects and embodiments of the invention are described in further detail below. The invention further provides methods, program codes, pilot processors, rake receivers, digital signal processors, receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
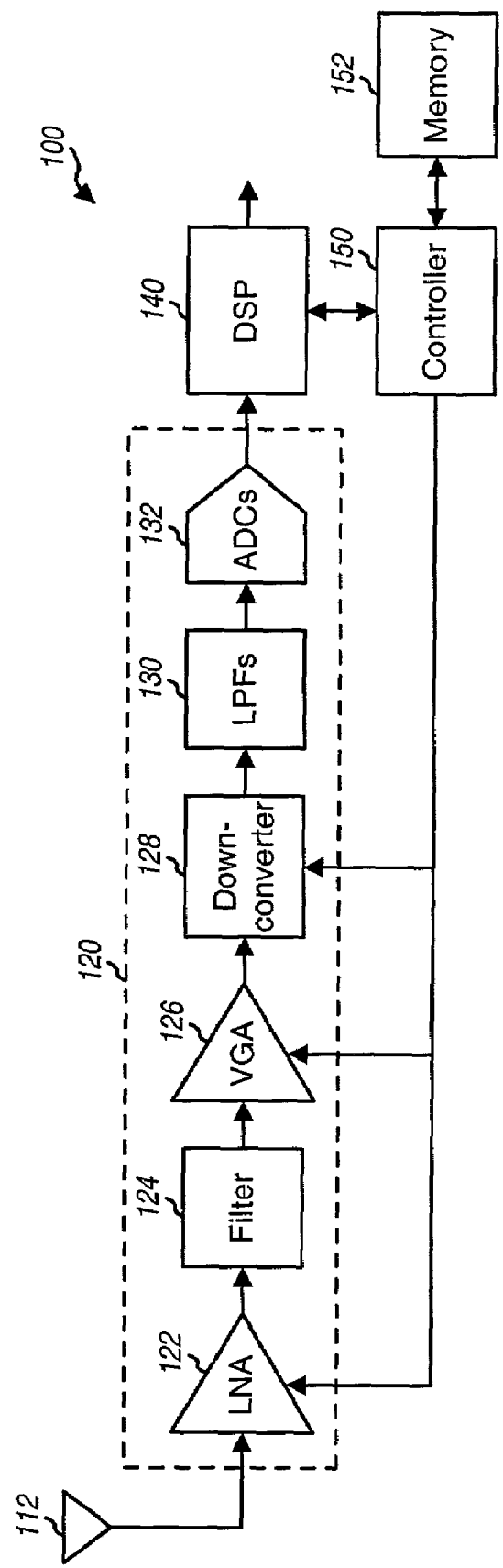
FIG. 1 is a block diagram of an embodiment of a receiver unit capable of implementing various aspects and embodiments of the invention.

FIG. 1 is a block diagram of an embodiment of a receiver unit 100 capable of implementing various aspects and embodiments of the invention. Receiver unit 100 may be implemented within a terminal or a base station of a wireless (e.g., CDMA) communication system. For clarity, various aspects and embodiments of the invention are described for a receiver unit in a terminal.

In FIG. 1, one or more RF modulated signals transmitted from one or more transmitter units (e.g., base stations, GPS satellites, broadcast stations, and so on) are received by an antenna 112 and provided to a receiver 120. Within receiver 120, the received signal is amplified by a low noise amplifier (LNA) 122 with a particular gain to provide an amplified RF signal. LNA 122 may comprise one or more LNA stages designed to provide a particular range of gains and/or attenuation (e.g., 40 dB from maximum gain to attenuation), and each LNA stage may be turned On or bypassed. The gain of LNA 122 may be determined by a gain control provided by a controller 150.

The amplified RF signal is then filtered by a (bandpass or lowpass) filter 124 to remove noise and spurious signals that can cause inter-modulation products in the subsequent signal processing stages. The filtered RF signal is further amplified by a variable gain amplifier (VGA) 126 to provide a signal having the desired signal level. VGA 126 may also comprise one or more amplifier stages, and the gain of VGA 126 may be determined by another gain control provided by an automatic gain control (AGC) loop, which may be implemented within controller 150. The AGCed RF signal from VGA 126 is then provided to a downconverter 128.

Downconverter 128 performs quadrature downconversion of the AGCed RF signal from RF down to baseband. For a direct downconversion, this may be achieved by multiplying (or mixing) the AGCed RF signal with a complex local oscillator (LO) signal to provide a complex baseband signal. In particular, the AGCed RF signal may be mixed with an inphase LO signal to provide an inphase (I) baseband component and mixed with a quadrature LO signal to provide a quadrature (Q) baseband component. For a heterodyne receiver, the downconversion may be performed in multiple stages (e.g., from RF down to IF, and then from IF down to baseband). In any case, the mixer used to perform the downconversion may be implemented with multiple stages that may be controlled to provide different gains, and the specific gain to be provided by the mixer may also be determined by another gain control from controller 150.

The I and Q baseband components are then filtered by lowpass filters (LPFs) 130 to remove spurious signals and out-of-band noise. The filtered I and Q components are then digitized by analog-to-digital converters (ADCs) 132 to provide I and Q samples, respectively. In a specific embodiment, ADCs 132 provide 4-bit I and Q samples at 2 times the chip rate (i.e., chip×2). The I and Q samples are provided from ADCs 132 to a digital signal processor (DSP) 140.

DSP 140 demodulates and decodes the I and Q samples to recover the transmitted data. DSP 140 may implement a rake receiver that can concurrently process multiple signal instances in the received signal, as described below.

Controller 150 directs various operations of receiver unit 100. Controller 150 may provide the various controls for LNA 122, VGA 126, downconverter 128, and DSP 140. For example, controller 150 may provide the controls to selectively turn On or bypass each LNA stage, depending on whether or not the gain of that LNA stage is needed. A memory 152 provides storage for data and program codes for controller 150.

In a typical receiver design, the conditioning of the received signal may be performed by one or more stages of amplifier, filter, mixer, and so on. In addition, filtering may be performed before and/or after the LNA stages. For simplicity, the various signal conditioning stages are lumped together into the blocks shown in FIG. 1. Other RF receiver designs may also be used and are within the scope of the invention.

Figure 2:
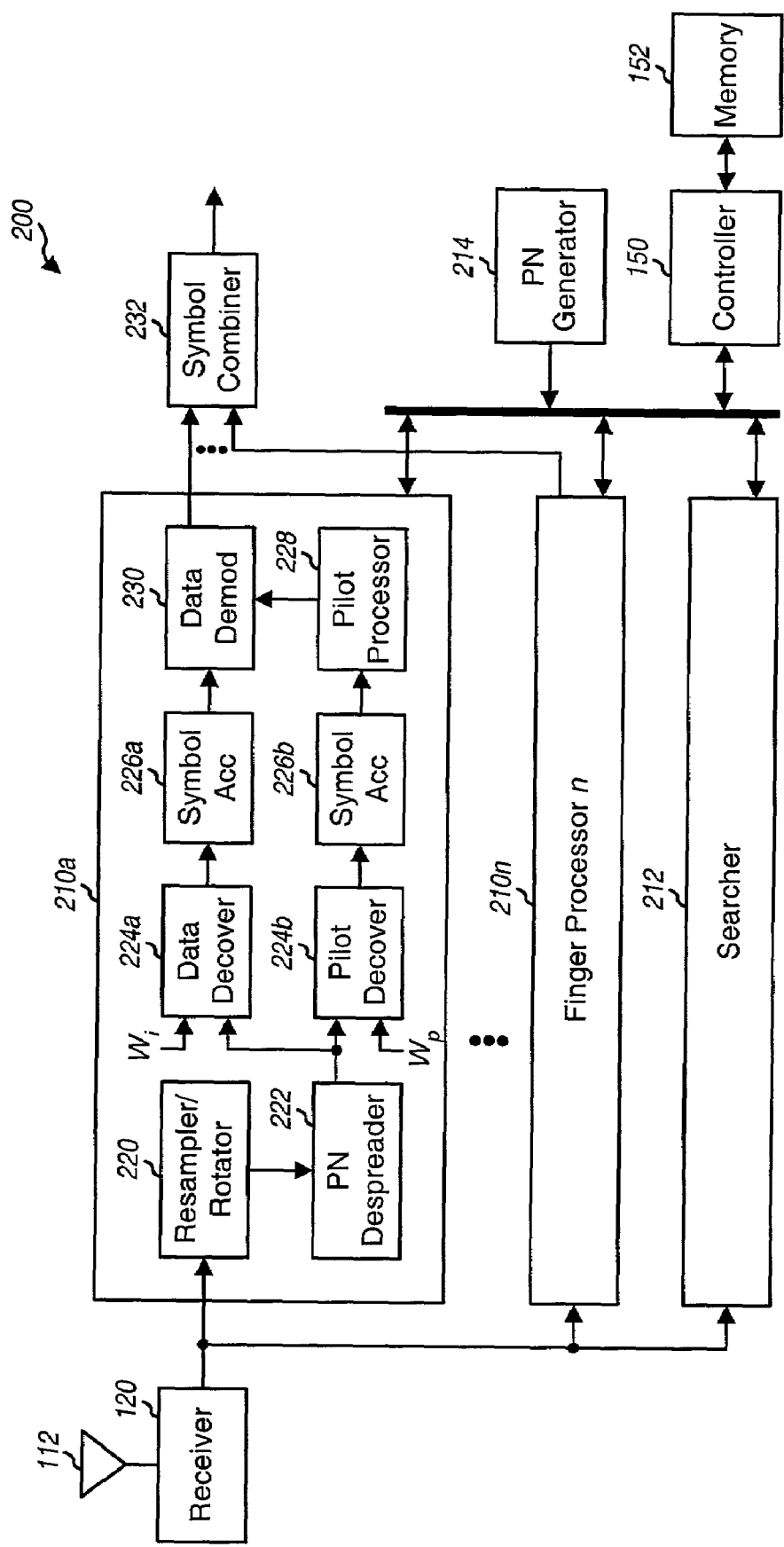
FIG. 2 is a block diagram of an embodiment of a rake receiver within a digital signal processor (DSP)

FIG. 2 is a block diagram of an embodiment of a rake receiver 200 within DSP 140. In a multipath environment, a modulated signal transmitted from a particular transmitter unit may arrive at the receiver unit via a number of signal paths, which may include the line-of-sight path and/or reflected paths. The received signal may thus comprise a number of instances of one or more modulated signals from one or more transmitter units. Each signal instance (or multipath) is associated with a particular magnitude, phase, and arrival time.

Receiver 120 conditions and digitizes the received signal to provide a stream of data samples, with each data sample comprising a pair of I and Q samples. The data samples are then provided to a number of finger processors 210 and a searcher 212 within rake receiver 200. Searcher 212 is used to search for strong signal instances in the received signal and to provide an indication of the strength and timing of each found signal instance that meets a set of criteria. Each finger processor 210 may then be assigned to process a respective signal instance of interest (e.g., a signal instance of sufficient strength, as determined by controller 150 based on the signal strength information provided by searcher 212).

Within each assigned finger processor 210, a resampler/rotator 220 first resamples the data samples at the proper "fine-grain" timing phase (as determined by the finger processor's timing recovery function) to provide interpolated samples at the chip rate and with the proper sample timing. The interpolated samples are then frequency-translated with a complex sinusoidal signal to remove phase rotation in the interpolated samples due to Doppler frequency shift and/or downconversion frequency error. The rotated samples are then provided to a PN despreader 222, which also receives a (complex-conjugate) PN sequence, $PN_i$, having a specific PN state (or PN phase) corresponding to the arrival time of the signal instance being processed by the finger processor. PN despreader 222 despreads the rotated samples with the received PN sequence and provides despread samples. For W-CDMA, PN despreader 222 descrambles the rotated samples with a scrambling code to provide the despread samples.

To recover the data on a particular code channel, the despread samples from PN despreader 222 are first multiplied by a data decoverer 224a with the same channelization code, $W_i$, assigned to the code channel being recovered by the finger processor. The channelization code may be a Walsh code (for IS-95, IS-856, and cdma2000 systems), an orthogonal variable spreading factor (OVSF) code (for W-CDMA system), or some other code. The decovered data samples are then accumulated by an accumulator 226a over the channelization code length to provide data symbols. Since the data on each code channel is covered with a different channelization code, decovering with the assigned channelization code, $W_i$, effectively extracts the data on the desired code channel and removes the data on the other code channels, if orthogonality between the code channels is maintained after transmission through the communication link. The data symbols from accumulator 226a represent a "data signal" for the signal instance being processed by the finger processor.

To recover the pilot, a pilot decoverer 224b first multiplies the despread samples with the same channelization code, $W_p$, used to cover the pilot data at the transmitter unit (which is a channelization code of zero for many CDMA systems). The decovered pilot samples are then accumulated by an accumulator 226b over a particular accumulation time interval to provide recovered pilot symbols. The accumulation time interval is typically an integer multiple (i.e., 1, 2, and so on) of the channelization code length. The processing performed by decoverer 224 and accumulator 226 is collectively referred to as "decovering", and these two elements are collectively referred to as a "decover".

The pilot symbols from accumulator 226b represent the recovered pilot for the signal instance being processed by the finger processor. A pilot processor 228 then receives and uses the recovered pilot symbols to generate a "reference signal". In particular, for a gated pilot transmission scheme whereby the pilot is transmitted in bursts at regular or known time intervals, as described below, pilot processor 228 interpolates the recovered pilot symbols to provide interpolated pilot symbols at various desired time instances between the time instances for the pilot bursts (e.g., at time instances corresponding to the data symbols). The interpolated pilot symbols may further be filtered based on a particular lowpass filter response. The reference signal comprises pilot estimates, which may be the filtered or unfiltered interpolated pilot symbols depending on whether or not pilot filtering is performed.

A data demodulator 230 receives and demodulates the data symbols with the pilot estimates to provide demodulated symbols (i.e., demodulated data), which are then provided to a symbol combiner 232. Symbol combiner 232 receives and coherently combines the demodulated symbols from all finger processors 210 assigned to process a particular data transmission. The recovered symbols from symbol combiner 232 are then provided to a decoder for further processing. The data demodulation and symbol combining may be achieved as described in U.S. Pat. No. 5,764,687 patent, which is incorporated herein by reference. The '687 patent describes BPSK data demodulation for IS-95 by performing dot product between the data symbols and the pilot estimates. The demodulation of QPSK modulation, which is used in IS-856, cdma2000, and W-CDMA, is a straightforward extension of the techniques described in the '687 patent. That is, instead of dot product, both dot product and cross product are used to recover the inphase and quadrature streams.

Some CDMA systems, such as IS-856 and W-CDMA systems, utilize a gated pilot transmission scheme to transmit a pilot on the forward link (i.e., the downlink). For the gated pilot transmission scheme, pilot bursts of a particular time duration are transmitted at regular or known time intervals. The pilot burst duration and the pilot burst interval are typically known by (or may be communicated to) the receiver units. The pilot transmission schemes for IS-856 and W-CDMA are described below.

Figure 3A:
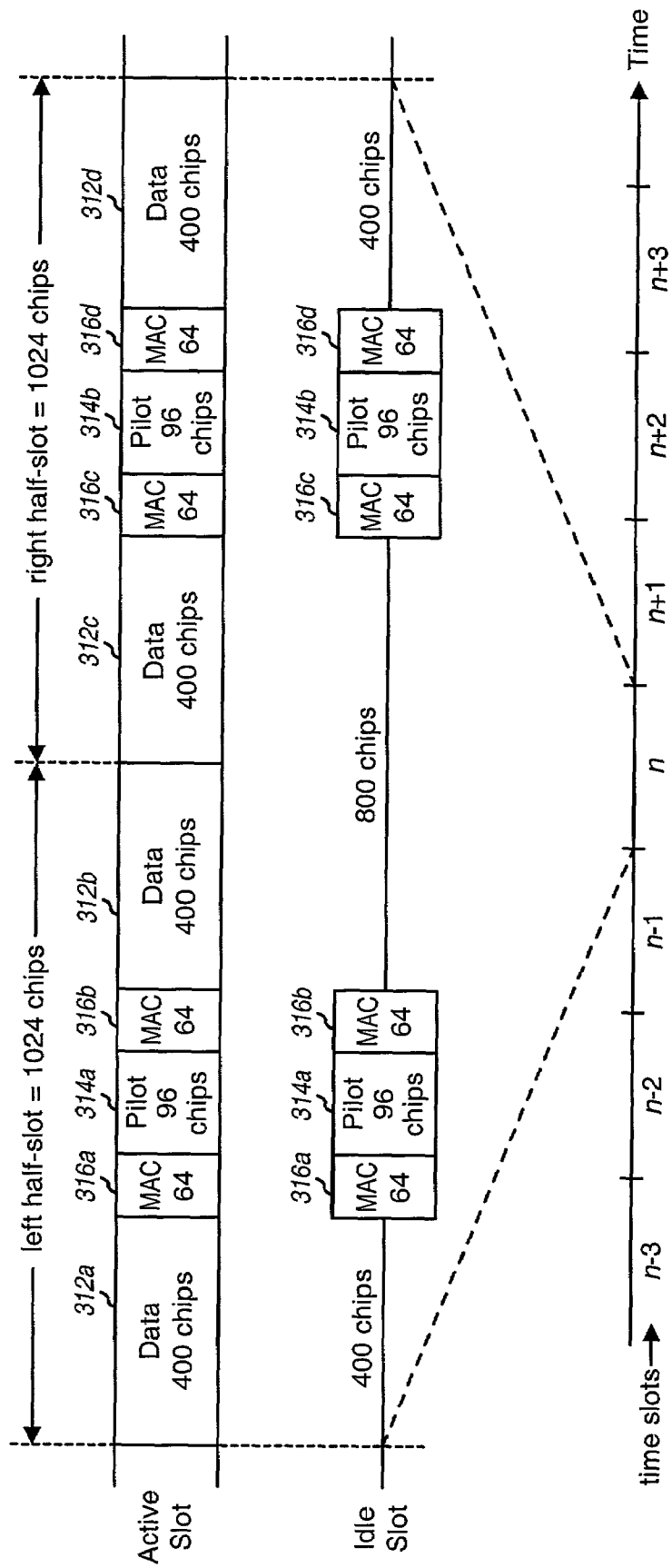
FIGS. 3A and 3B are diagrams of transmission formats defined by IS-856 and W-CDMA, respectively, for the forward link (i.e., downlink)

FIG. 3A is a diagram of a transmission format defined by IS-856 for the forward link. Each active slot is divided into two half-slots, with each half-slot including two data partitions 312 separated by a pilot burst 314. Data partitions 312 may be used to transmit user-specific data and signaling, and pilot bursts 314 may be used to transmit a pilot. The left half-slot includes data partitions 312a and 312b separated by pilot burst 314a, and the right half-slot includes data partitions 312c and 312d separated by pilot burst 314b. For IS-856, each pilot burst 314 comprises 96 chips of all-zero data.

The left half-slot further includes two signaling bursts 316a and 316b placed on both sides of pilot burst 314a, and the right half-slot further includes signaling bursts 316c and 316d placed on both sides of pilot burst 314b. These signaling bursts 316 are used to implement a Media Access Control (MAC) channel that is used to transmit reverse power control (RPC) information and other information. The RPC information directs the terminals to adjust their transmit power either up or down to achieve the desired signal quality at the receiving base station.

Each idle slot is also divided into two half-slots, and each half-slot also includes one pilot burst 314 of the same width (e.g., 96 chips) and located in the same position in the half-slot as in the active slot. Two signaling bursts 316 (each of 64 chips in duration) are positioned on both sides of each pilot burst 314. The signaling bursts provide a transition period between no transmission and pilot transmission and between pilot transmission and no transmission. The transition period allows the pilot to reach or be near its steady state value for the duration of the (e.g., 96-chip) pilot burst. The pilot bursts for the idle slot are intended to be essentially indistinguishable from the pilot bursts for the active slot.

Figure 3B:
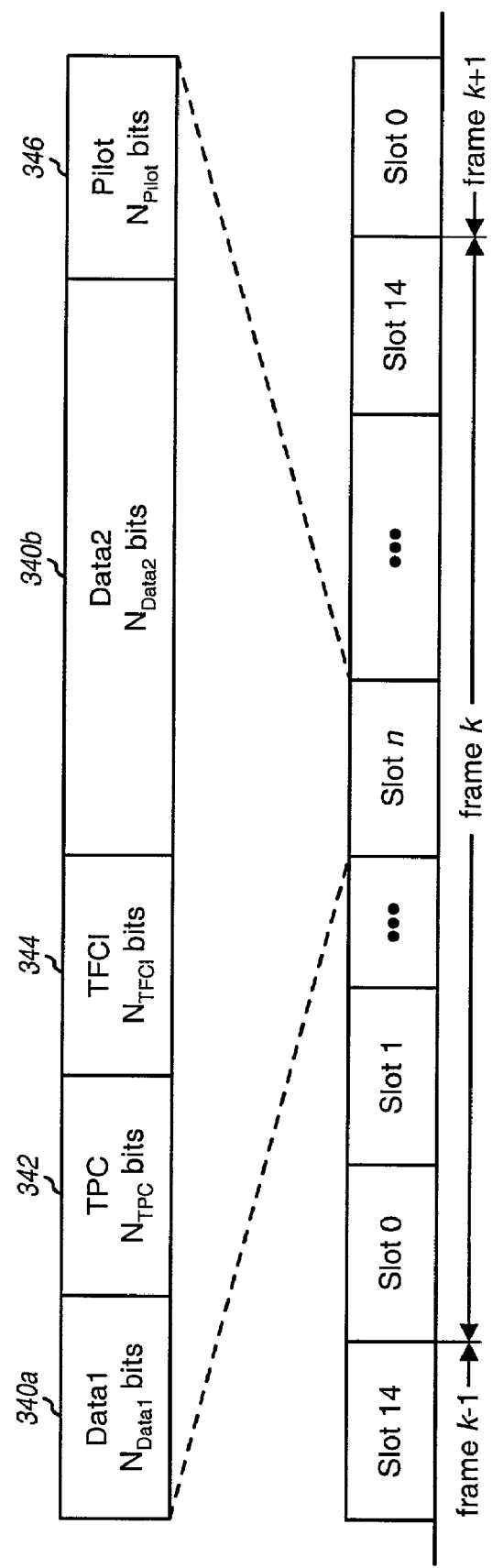

FIG. 3B is a diagram of a transmission format for a downlink dedicated physical channel as defined by W-CDMA. Generally, a different frame format is defined by W-CDMA for each type of physical channel such as the downlink dedicated channel (DPCH), the downlink shared channel (DSCH), and so on. The data to be transmitted on each physical channel is partitioned into (10 msec) radio frames, with each radio frame including 15 slots labeled as slot 0 through slot 14. Each slot is further partitioned into one or more fields used to carry packet data, signaling, and pilot data.

As shown in FIG. 3B, for the dedicated physical channel, each slot includes a first data (Data1) field 340a, a second data (Data2) field 340b, a transmit power control (TPC) field 342, a transport format combination indicator (TFCI) field 344, and a pilot field 346. Data fields 340a and 340b are used to send packet data for the dedicated physical channel. TPC field 342 is used to send power control information to direct the receiver units to adjust their uplink transmit power either up or down. TFCI field 344 is used to send information indicative of the format (e.g., the bit rate, channelization code, and so on) of a shared physical channel associated with the dedicated physical channel. Pilot field 346 is used to send pilot data for the dedicated physical channel.

W-CDMA also defines a set of slot formats that may be used for the dedicated physical channel. Each slot format defines the length (in number of bits) of each field in the slot. The bit rate of the dedicated physical channel can vary between 15 Kbps to 1920 Kbps and the number of bits in each slot varies correspondingly. One or more of the fields described above may be omitted (i.e., length=0) for some of the slot formats.

As described above, phase discontinuities may be induced in the received signal when circuit elements in the received signal path are switched or adjusted in discrete steps. The magnitude of the phase discontinuity is related to the phase difference, for example, between two signal paths being switched (e.g., between the gain and bypass paths of an LNA stage) or between two settings of a particular circuit element being adjusted (e.g., between high gain and low gain for a VGA stage). This phase error is included in the data samples from ADCs 132.

Referring back to FIG. 2, a phase discontinuity in the received signal is reflected almost immediately in the data signal (i.e., the data symbols) from symbol accumulator 226a because no filtering is used in the data recovery path. For a gated pilot transmission scheme, such as those shown in FIGS. 3A and 3B, interpolation is used to provide the pilot estimates for the reference signal. If a phase discontinuity is induced in the received signal between two pilot bursts, then the pilot interpolation should be performed in a manner to account for the induced phase discontinuity. In particular, the reference signal should include the same phase discontinuities that appear in the data signal.

If a phase discontinuity in the received signal is sufficiently large and not accounted for in the reference signal, then there is a correspondingly large phase error between the reference and data signals, especially at the time instance where the phase discontinuity occurred. This phase error manifests itself in the demodulated data from data demodulator 230 in FIG. 2. If the phase error is sufficiently large, then the demodulated data may be decoded in error. An entire packet (or frame) of decoded data may be deemed to have been received in error and declared erased even if only some of the data bits are decoded in error.

Techniques are provided herein to generate a reference signal for a gated pilot in a manner to account for phase discontinuities induced in the received signal due to circuit changes in the received signal path. Typically, "notable" circuit changes in the received signal path (i.e., changes that may have deleterious effects on performance) are known at the receiver unit. For example, these circuit changes may be initiated by or made known to controller 150.

Moreover, the amount of phase change in the received signal due to each notable circuit change may also be known at the receiver unit to a requisite degree of accuracy. This may be achieved by characterizing and storing the phases of various circuit elements and settings in the received signal path. For example, each LNA stage may be associated with different phases for the gain and bypass paths, each VGA stage may be associated with different phases for different gain steps, and so on. The phases for these circuit elements/settings may be determined during the design or manufacturing phase, and may be determined based on computer simulation, empirical measurements, and so on. A table of circuit settings and their associated phases may be stored in a look-up table in the receiver unit (e.g., in memory 152 in FIG. 1). During normal operation, the look-up table may be accessed to retrieve the phases for the new and prior circuit settings, and the difference between these two phases would then be an estimate of the phase change due to the switch to the new circuit setting. Alternatively, a table may be used to store the estimated phase change between any two different circuit settings.

The information regarding when a notable circuit change has been made and the phases associated with the new and prior circuit settings (or just the phase change between the two circuit settings) can be provided to an entity (e.g., controller 150 in FIG. 1). This entity can then use the information to generate (or direct the generation of) a reference signal having a phase that more closely matches that of the data signal, which is similarly affected by the induced phase change. A more accurately generated reference signal may result in improved data demodulation performance.

Figure 4A:
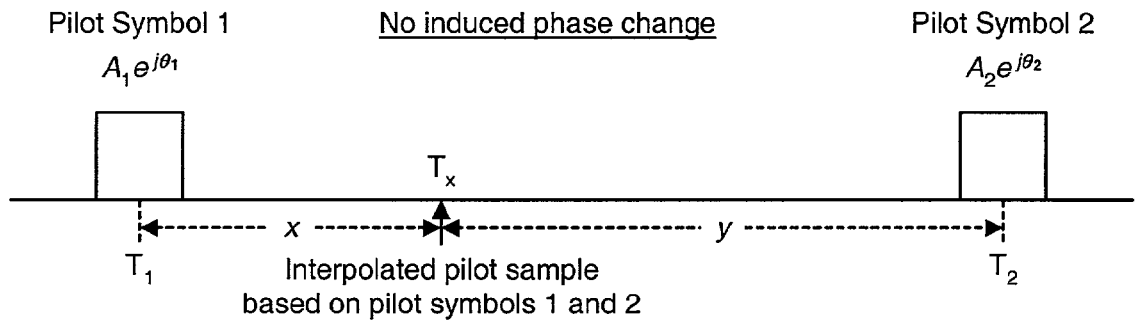
FIGS. 4A through 4C are diagrams that graphically illustrate pilot interpolation with compensation for induced phase discontinuities.
Figure 4B:
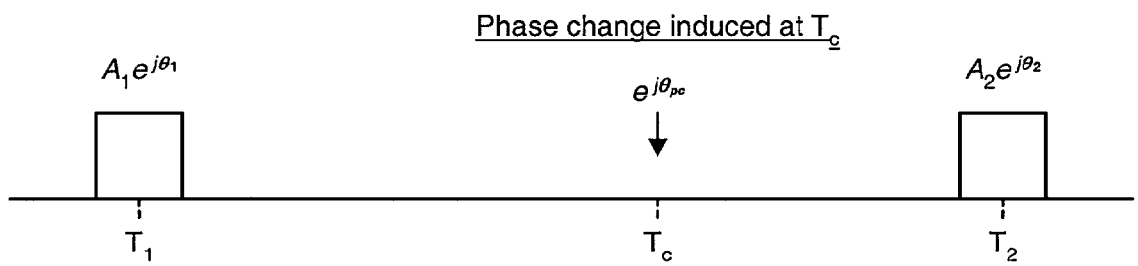
Figure 4C:
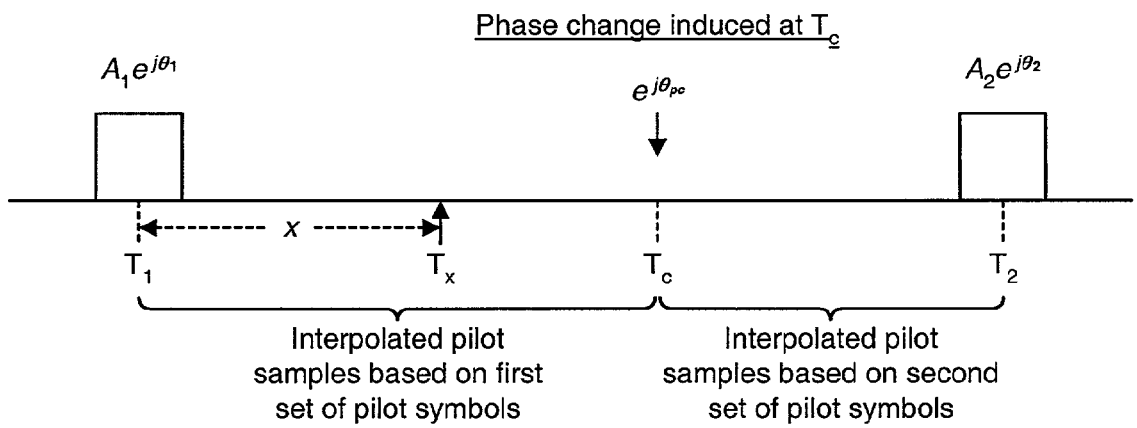

FIGS. 4A through 4C are diagrams that graphically illustrate pilot interpolation with compensation for induced phase discontinuities, in accordance with an embodiment of the invention. In FIG. 4A, the first pilot symbol is received at time $T_1$ and the second pilot symbol is received at time $T_2$. The first and second pilot symbols, $P_1$ and $P_2$, are complex values that may be expressed as:

$$P_1 = a_1 + jb_1 = A_1 e^{j\theta_1}, \text{ and} \qquad \text{Eq (1)}$$
$$P_2 = a_2 + jb_2 = A_2 e^{j\theta_2},$$

where $a_1$, $a_2$, $b_1$, and $b_2$ can each take on any value within a specified range (e.g., from 0 through 255). If no phase change has been induced between times $T_1$ and $T_2$, then pilot interpolation may be performed in the normal manner to provide interpolated pilot symbols at various time instances between $T_1$ and $T_2$.

Interpolation may be performed in various manners, as is known in the art. For example, linear interpolation may be performed whereby a pair of recovered pilot symbols at two given time instances is used to derive interpolated pilot symbols at various time instances between these two given time instances. Higher order interpolation may also be performed whereby an interpolated pilot symbol is derived based on more than two recovered pilot symbols, and this is within the scope of the invention (but not described herein for simplicity). Moreover, interpolation may be performed based on "cartesian" interpolation, "polar" interpolation, or some other interpolation technique.

For linear cartesian interpolation, the interpolated pilot symbol, $P_{cart,x}$, at time $T_x$, which is a time distance of x from $T_1$, may be expressed as:

$$P_{cart,x} = y(a_1 + jb_1) + x(a_2 + jb_2), \qquad \text{Eq (2)}$$

where x and y are normalized such that $$x = (T_x - T_1)/(T_2 - T_1),$$
$$y = (T_2 - T_x)/(T_2 - T_1), \text{ and}$$
$$x + y = 1.$$

And for linear polar interpolation, the interpolated pilot symbol, $P_{polar,x}$, at time $T_x$, may be expressed as:

$$P_{polar,x} = (yA_1 + xA_2)e^{j(y\theta_1+x\theta_2)}. \quad \text{Eq (3)}$$

As shown in equation (3), the magnitude and phase are each linearly interpolated for polar interpolation.

FIG. 4B shows an induced phase change at time $T_c$ due to a circuit change in the received signal path. The induced phase change of $e^{j\theta_{pc}}$ is reflected (i.e., included) in the second pilot symbol (which for simplicity is assumed to have the same complex value of $(a_2+jb_2)$ as for the second pilot symbol shown in FIG. 4A). This induced phase change may be compensated for in performing the interpolation to obtain the interpolated pilot symbols.

In a first scheme for compensating for an induced phase change, the same phase change is introduced in the interpolated pilot symbols at the time the phase change is induced. For linear cartesian interpolation, the interpolated pilot symbol, $P_{cart,c}$, at time $T_c$, may be determined initially as follows:

$$P_{cart,c} = (1-t_c)(a_1+jb_1) + t_c(a_2+jb_2), \quad \text{Eq (4)}$$
$$= A_c e^{j\theta_c},$$

where $t_c$ is normalized such that $t_c=(T_c-T_1)/(T_2-T_1)$. The interpolated pilot symbol, $P_{cart,c}$, may then be rotated in both forward and backward directions to generate two phase-rotated symbols, $P_{cart,c1}$ and $P_{cart,c2}$, that are separated by the induced phase change of $e^{j\theta_{pc}}$.

The induced phase change, $e^{j\theta_{pc}}$, can be apportioned to the two phase-rotated symbols, $P_{cart,c1}$ and $P_{cart,c2}$, for example, based on the time when the phase change occurred, as follows:

$$P_{cart,c1} = A_c e^{j(\theta_c - t_c\theta_{pc})} = A_c e^{j\theta_{c1}}, \text{ and} \quad \text{Eq (5)}$$
$$P_{cart,c2} = A_c e^{j(\theta_c - t_c\theta_{pc}+\theta_{pc})} = A_c e^{j\theta_{c2}}.$$

As shown in equation (5), $P_{cart,c2}$ can be obtained by rotating $P_{cart,c1}$ by the induced phase change of $e^{j\theta_{pc}}$. As also shown in equation (5), if the phase change occurs near time $T_1$ (i.e., $t_c \to 0$), then the phase-rotated symbol, $P_{cart,c2}$, would include most of the induced phase change. Alternatively, if the phase change occurs near time $T_2$ (i.e., $t_c \to 1$), then the phase-rotated symbol, $P_{cart,c1}$, would include most of the induced phase change.

Figure 5A:
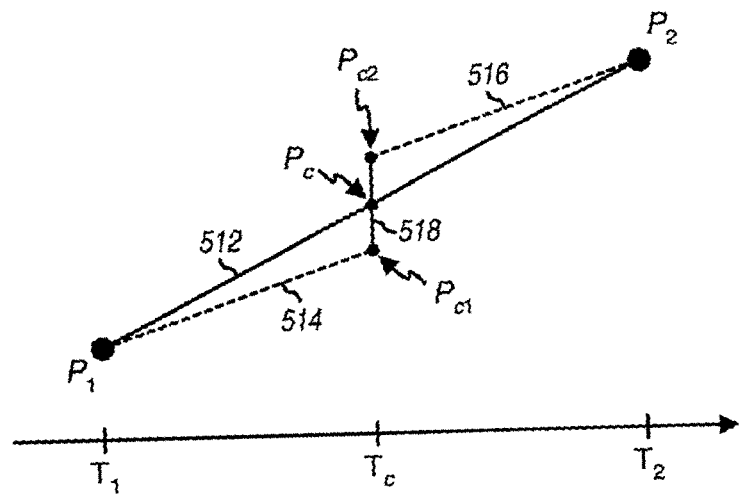
FIGS. 5A through 5C graphically illustrate the generation of phase-rotated symbols for a first phase compensation scheme.
Figure 5B:
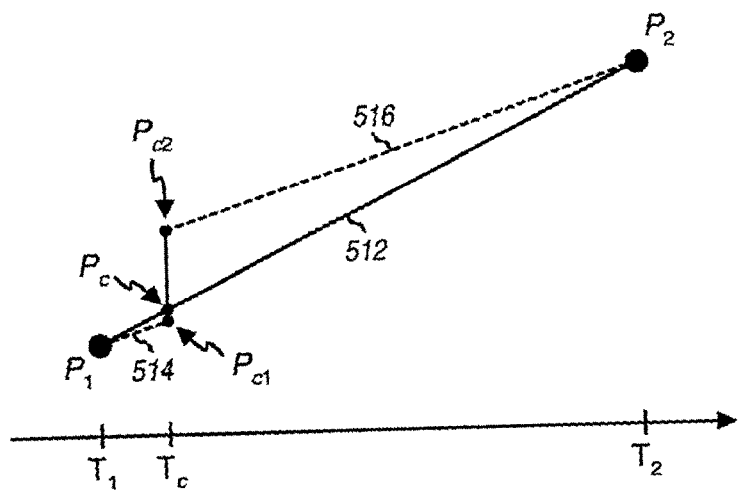
Figure 5C:
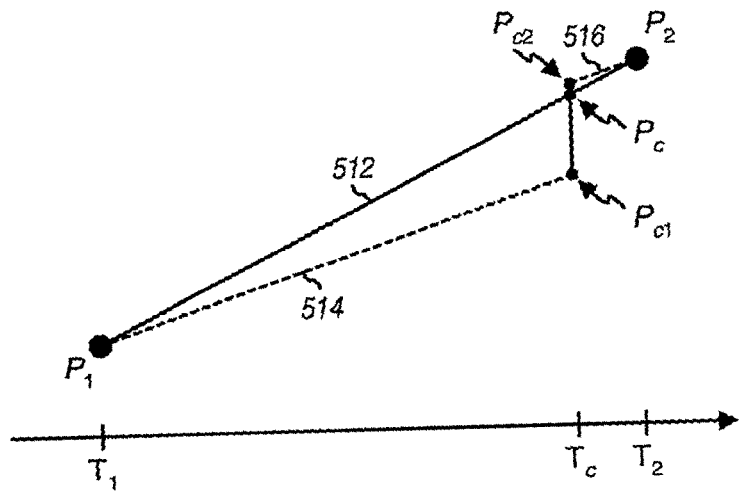

FIG. 4C shows the generation of the interpolated pilot symbols to account for the induced phase change. The phase-rotated symbols, $P_{cart,c1}$ and $P_{cart,c2}$, derived above in equation (5) may be used for the pilot interpolation. Specifically, for the time period between $T_1$ and $T_c$ (i.e., $T_1 < t < T_c$), the pilot interpolation may be performed based on a first set of symbols comprised of $P_1$ and $P_{cart,c1}$, with $P_1$ being the pilot symbol recovered for the pilot burst at time $T_1$ and $P_{cart,c1}$ being derived as described above. And for the time period between $T_c$ and $T_2$ (i.e., $T_c < t < T_2$), the pilot interpolation may be performed based on a second set of symbols comprised of $P_{cart,c2}$ and $P_2$, with $P_2$ being the pilot symbol recovered for the pilot burst at time $T_2$ and $P_{cart,c2}$ being derived as described above. For linear cartesian interpolation, the interpolated pilot symbol, $P_{cart,x}$, at time $T_x$ may then be expressed as:

$$P_{cart,x} = \begin{cases} yP_1 + xP_{cart,c1} & \text{for } T_1 < T_x < T_c, \text{ and} \\ yP_{cart,c2} + xP_2 & \text{for } T_c < T_x < T_2, \end{cases} \quad \text{Eq (6)}$$

where $P_1 = a_1 + jb_1,$ $P_2 = a_2 + jb_2,$ $P_{cart,c1} = A_c\cos(\theta_{c1}) + jA_c\sin(\theta_{c1}),$ and $P_{cart,c2} = A_c\cos(\theta_{c2}) + jA_c\sin(\theta_{c2}).$ FIGS. 5A through 5C graphically illustrate the generation of the phase-rotated symbols for the first phase compensation scheme described above. In FIG. 5A, a solid line 512 between pilot symbols, $P_1$ and $P_2$, at times $T_1$ and $T_2$ represents the initial linear interpolation to obtain the interpolated pilot symbol, $P_c$, at time $T_c$. In the example shown in FIG. 5A, the induced phase change occurs at the midpoint between times $T_1$ and $T_2$. The induced phase change is then apportioned equally to the phase-rotated symbols, $P_{c1}$ and $P_{c2}$. The symbols, $P_1$ and $P_{c1}$, are then used to derive the interpolated pilot symbols between times $T_1$ and $T_c$, which are represented by a dashed line 514. Similarly, the symbols, $P_{c2}$ and $P_2$, are used to derive the interpolated pilot symbols between times $T_c$ and $T_2$, which are represented by a dashed line 516. A vertical line 518 graphically represents the phase discontinuity in the reference signal (which is comprised of the interpolated pilot symbols) between times $T_1$ and $T_2$.

FIG. 5B shows the pilot interpolation when the induced phase change occurs near time $T_1$. In this case, the phase-rotated symbol $P_{c2}$ includes most of the induced phase change.

FIG. 5C shows the pilot interpolation when the induced phase change occurs near time $T_2$. In this case, the phase-rotated symbol $P_{c1}$ includes most of the induced phase change.

In a second scheme for compensating for an induced phase change, the recovered pilot symbols at times $T_1$ and $T_2$ are each rotated by the same phase change, and these phase-rotated symbols are then used to derive the interpolated pilot symbols. For linear cartesian interpolation, the recovered pilot symbol $P_1$ at time $T_1$ can be rotated forward by the induced phase change of $e^{j\theta_{pc}}$ to obtain a phase-rotated symbol, $P_{rot,1}$. Similarly, the recovered pilot symbol $P_2$ at time $T_2$ can be rotated backward by the induced phase change of $e^{j\theta_{pc}}$ to obtain a phase-rotated symbol, $P_{rot,2}$. These phase-rotated symbols may be expressed as:

$$P_{rot,1} = A_1 e^{j(\theta_1+\theta_{pc})} \quad \text{Eq (7)}$$
$$= A_1\cos(\theta_1+\theta_{pc}) + jA_1\sin(\theta_1+\theta_{pc}),$$

and $$P_{rot,2} = A_2 e^{j(\theta_2-\theta_{pc})}$$
$$= A_2\cos(\theta_2-\theta_{pc}) + jA_2\sin(\theta_2-\theta_{pc}).$$

For the time period between $T_1$ and $T_c$, the pilot interpolation may be performed based on the first set of symbols comprised of $P_1$ and $P_{rot,2}$. And for the time period between $T_c$ and $T_2$, the pilot interpolation may be performed based on the second set of symbols comprised of $P_{rot,1}$ and $P_2$. The interpolated pilot symbol, $P_{cart,x}$, at time $T_x$ may then be expressed as:

$$P_{cart,x} = \begin{cases} yP_1 + xP_{rot,c2} & \text{for } T_1 < T_x < T_c, \text{ and} \\ yP_{rot,c1} + xP_2 & \text{for } T_c < T_x < T_2. \end{cases} \quad \text{Eq (8)}$$

Other schemes for deriving two sets of symbols to use for generating the interpolated pilot symbols may also be contemplated, and this is within the scope of the invention.

As noted above, polar interpolation may also be performed to obtain the interpolated pilot symbols. For the first phase compensation scheme, the induced phase change is reflected in the interpolated pilot symbols at the time the phase change is induced. For linear polar interpolation, the interpolated pilot symbol, $P_{polar,c}$, at time $T_c$, may be determined initially as follows:

$$P_{polar,c} = \{(1-t_c)A_1 + t_c A_2\} e^{j\{(1-t_c)\theta_1 + t_c\theta_2\}}, \quad \text{Eq (9)}$$
$$= A_{cp} e^{j\theta_{cp}}.$$

The interpolated pilot symbol, $P_{polar,c}$, may then be rotated in both forward and backward directions to generate two phase-rotated symbols, $P_{polar,c1}$ and $P_{polar,c2}$, that are separated by the induced phase change of $e^{j\theta_{pc}}$.

Again, the induced phase change, $e^{j\theta_{pc}}$, can be apportioned to the two phase-rotated symbols, $P_{polar,c1}$ and $P_{polar,c2}$, based on the time when the phase change occurred, as follows:

$$P_{polar,c1} = A_{cp} e^{j(\theta_{cp} - t_c \theta_{pc})} = A_{cp} e^{j\theta_{cp1}}, \text{ and} \quad \text{Eq (10)}$$
$$P_{polar,c2} = A_{cp} e^{j(\theta_{cp} - t_c \theta_{pc} + \theta_{pc})} = A_{cp} e^{j\theta_{cp2}}.$$

As shown in equation (10), $P_{polar,c2}$ can be obtained by rotating $P_{polar,c1}$ by the induced phase change of $e^{j\theta_{pc}}$.

For the time period between $T_1$ and $T_c$, the pilot interpolation may be performed based on the first set of symbols comprised of $P_1$ and $P_{polar,c1}$. And for the time period between $T_c$ and $T_2$, the pilot interpolation may be performed based on the second set of symbols comprised of $P_{polar,c2}$ and $P_2$. The interpolated pilot symbol, $P_{polar,x}$, at time $T_x$ (or the normalized time $t_x$) may then be expressed as:

$$P_{polar,x} = \quad \text{Eq (11)}$$
$$\begin{cases} \{(1-t_x)A_1 + t_x A_{cp}\} e^{j\{(1-t_x)\theta_1 + t_x\theta_{cp1}\}} & \text{for } T_1 < t_x < T_c, \text{ and} \\ \{(1-t_x)A_{cp} + t_x A_2\} e^{j\{(1-t_x)\theta_{cp2} + t_x\theta_2\}} & \text{for } T_c < t_x < T_2. \end{cases}$$

The polar interpolation may also be performed based on the second phase compensation scheme described above whereby the pilot symbols $P_1$ and $P_2$ at times $T_1$ and $T_2$ are each rotated by the induced phase change and used to derive the interpolated pilot symbols.

Figure 6:
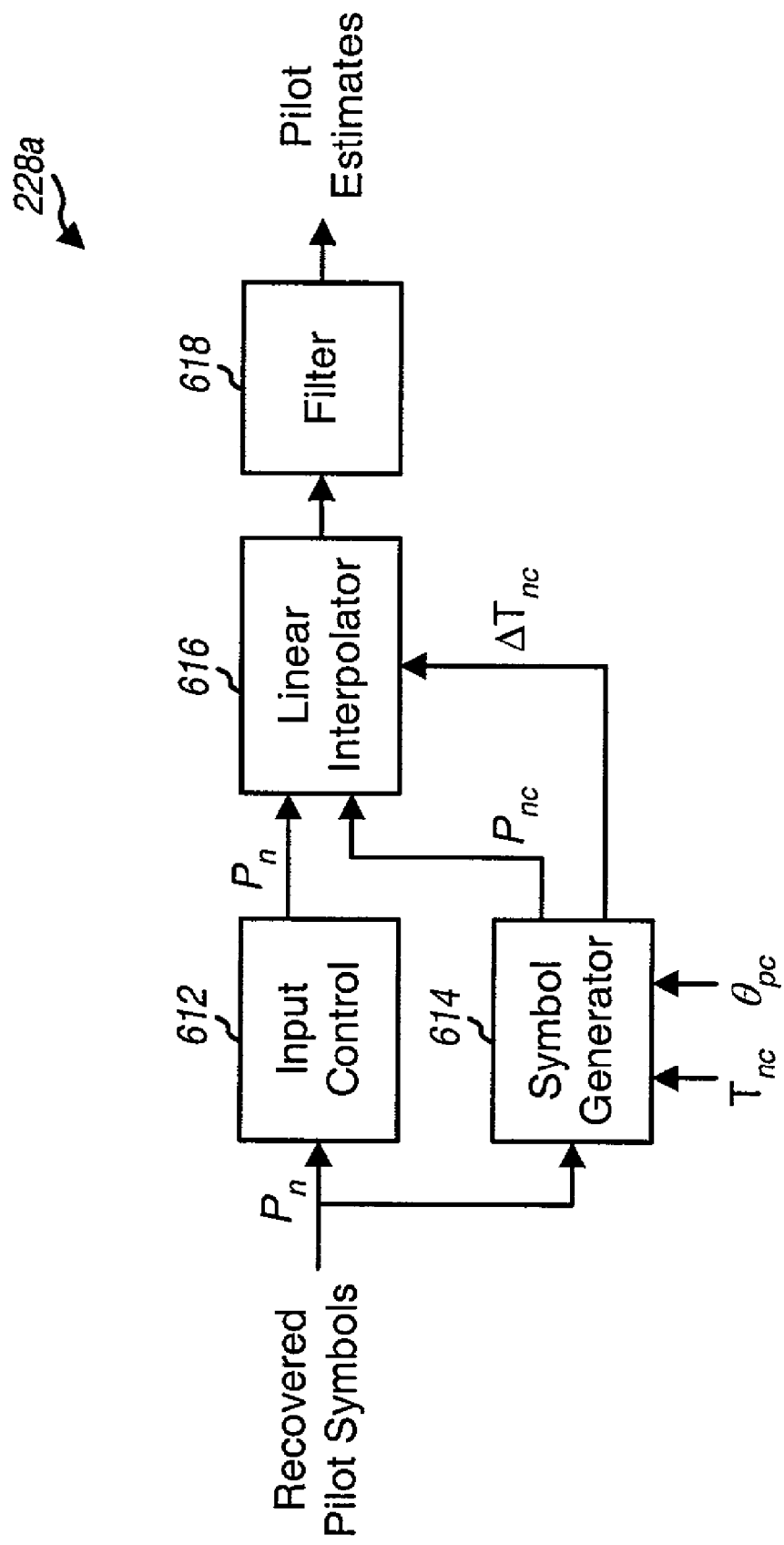
FIG. 6 is a block diagram of a specific embodiment of a pilot processor.

FIG. 6 is a block diagram of a specific embodiment of a pilot processor 228a, which may be used for pilot processor 228 in FIG. 2. The recovered pilot symbols are provided to an input control unit 612 and a phase-rotated symbol generator 614. For each recovered pilot symbol, $P_n$, if no phase change has been induced in the received signal since the time of the last recovered pilot symbol, $P_{n-1}$, then control unit 612 provides the two latest recovered pilot symbols, $P_{n-1}$ and $P_n$, to a linear interpolator 616. Interpolator 616 then derives the interpolated pilot symbols for the time period between the times $T_{n-1}$ and $T_n$ when the pilot bursts used to derive the recovered pilot symbols $P_{n-1}$ and $P_n$ were received.

Otherwise, if a phase change has been induced in the received signal since the time of the last recovered pilot symbol, then phase-rotated symbol generator 614 receives information indicative of the magnitude of the induced phase change, $\theta_{pc}$, and the time, $T_{nc}$, when the phase change occurred. Symbol generator 614 then derives phase-rotated symbols, $P_{cn1}$ and $P_{cn2}$, based on the recovered pilot symbols, $P_{n-1}$ and $P_n$, the induced phase change, $\theta_{pc}$, and the time of the phase change, $T_{nc}$, using any one of the schemes described above.

If a phase change has been induced, linear interpolator 616 is provided with $P_{n-1}$, $P_{cn1}$, and $\Delta T_{nc1}$ for the first portion of the current pilot burst interval, where $\Delta T_{nc1}$ is the time duration between the time $T_{n-1}$ for the recovered pilot symbol $P_{n-1}$ and the time $T_{nc}$ when the phase change occurred (i.e., $\Delta T_{nc1} = T_{nc} - T_{n-1}$). Linear interpolator 616 then derives the interpolated pilot symbols for the time period between $T_{nc}$ and $T_{n-1}$ based on the received information. Subsequently, linear interpolator 616 is provided with $P_{cn2}$, $P_n$, and $\Delta T_{nc2}$ for the second portion of the current pilot burst interval, where $\Delta T_{nc2}$ is the time duration between the time $T_{nc}$ when the phase change occurred and the time $T_n$ for the recovered pilot symbol $P_n$ (i.e., $\Delta T_{nc2} = T_n - T_{nc}$) Linear interpolator 616 then derives the interpolated pilot symbols for the time period between $T_{nc}$ and $T_n$ based on the received information.

A filter 618 may be used to filter the interpolated pilot symbols to remove noise and extraneous signals. Pilot processor 228a provides the reference signal comprised of pilot estimates. These pilot estimates are (1) the interpolated pilot symbols from linear interpolator 616 if filtering is not used, or (2) the filtered interpolated pilot symbols from filter 618 if filtering is used.

Figure 7:
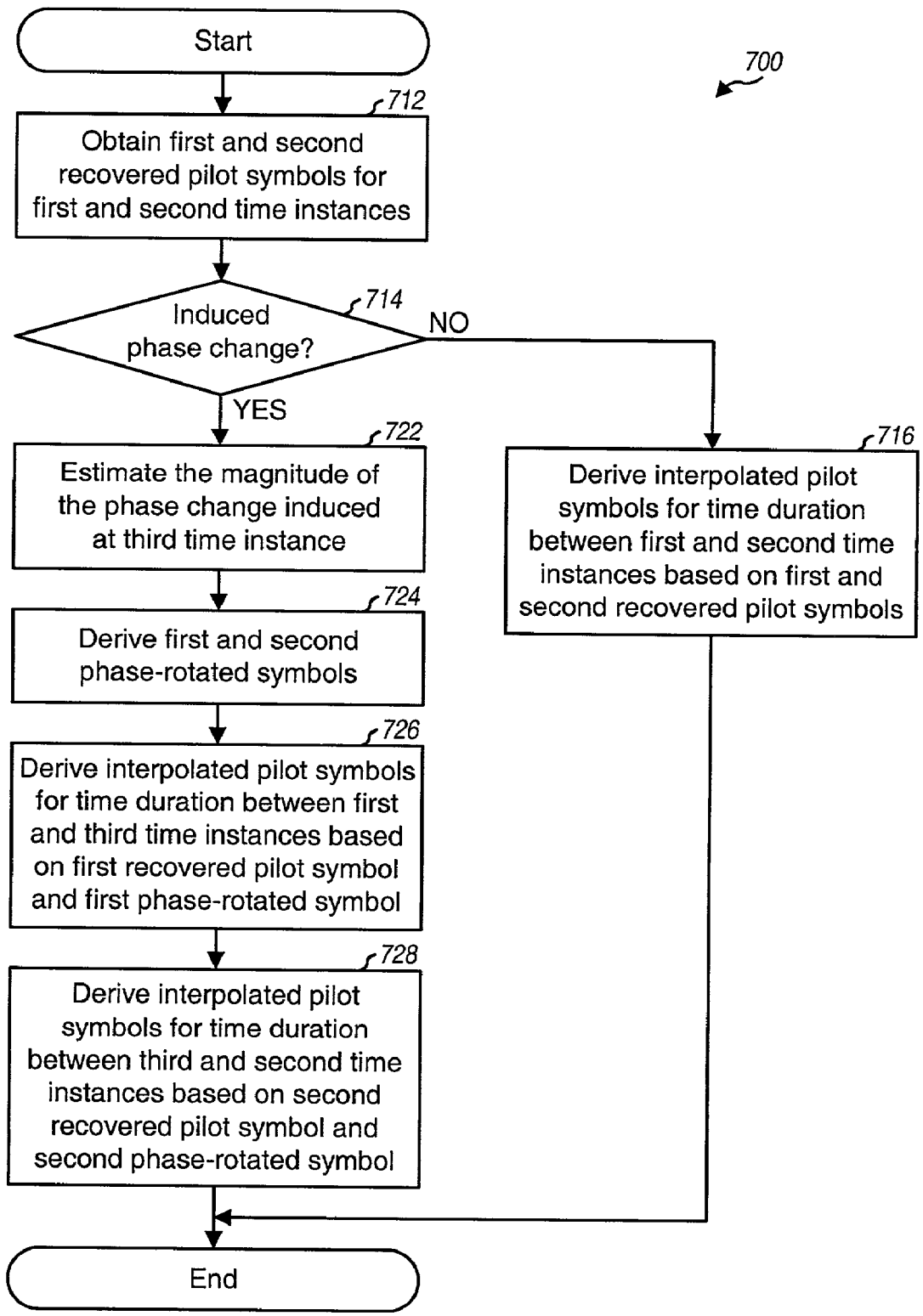
FIG. 7 is a flow diagram of an embodiment of a process for deriving interpolated pilot symbols for a gated pilot in a wireless communication system.

FIG. 7 is a flow diagram of an embodiment of a process 700 for deriving interpolated pilot symbols for a gated pilot in a wireless (e.g., IS-856 or W-CDMA) communication system. Initially, a first recovered pilot symbol, $P_{n-1}$, for a first time instance, $T_{n-1}$, and a second recovered pilot symbol, $P_n$, for a second time instance, $T_n$, are obtained (based on pilot bursts received for the gated pilot) (step 712). A determination is then made whether or not a phase change has been induced in the received signal (step 714). If the answer is no, then interpolated pilot symbols between the first and second time instances, $T_{n-1}$ and $T_n$, are derived in the normal manner based on the first and second recovered pilot symbols, $P_{n-1}$ and $P_n$ (step 716).

Otherwise, if a phase change has been induced in the received signal at a third time instance, $T_{nc}$, then the magnitude of the induced phase change, $\theta_{pc}$, is estimated (step 722). First and second phase-rotated symbols, $P_{cn1}$ and $P_{cn2}$, are then derived based on the first and second recovered pilot symbols, $P_{n-1}$ and $P_n$, the estimated induced phase change, $\theta_{pc}$, and (possibly) the third time instance, $T_{nc}$ (step 724).

The interpolated pilot symbols between the first and third time instances, $T_{n-1}$ and $T_{nc}$, are then derived based on the first recovered pilot symbol, $P_{n-1}$, and the first phase-rotated symbol, $P_{cn1}$ (step 726). Similarly, the interpolated pilot symbols between the third and second time instances, $T_{nc}$ and $T_n$, are derived based on the second phase-rotated symbol, $P_{cn2}$, and the second recovered pilot symbol, $P_n$ (step 728). The process is typically repeated for each recovered pilot symbol.

The phase compensation techniques described above may also be used when multiple phase changes are induced in the received signal between two given pilot bursts. In this case, the pilot interpolation may be performed such that each induced phase change is compensated for, one at a time, in chronological order. For example, if three phase changes, $\theta_{pc1}$, $\theta_{pc2}$ and $\theta_{pc3}$, were successively induced in the received signal at times $T_{nc1}$, $T_{nc2}$, and $T_{nc3}$, respectively, then the pilot interpolation between times $T_{n-1}$ and $T_n$ may be performed as described above by assuming that only the first phase change, $\theta_{pc1}$, had occurred at time $T_{nc1}$. Then the pilot interpolation between times $T_{cn1}$ and $T_n$ may be performed by assuming that only the second phase change, $\theta_{pc2}$, had occurred at time $T_{nc2}$. And finally, the pilot interpolation between times $T_{cn2}$ and $T_n$ may be performed by assuming that only the third phase change, $\theta_{pc3}$, had occurred at time $T_{nc3}$.

For clarity, various aspects and embodiments have been described above for linear interpolation. Various other types of interpolation may also be used to derive the interpolated pilot symbols, and this is within the scope of the invention. For example, spline interpolation may be used. Higher order interpolation may also be used, and this is also within the scope of the invention.

The pilot interpolation techniques described herein may be implemented by various means. For example, these techniques may be implemented in hardware, software, or a combination thereof. For a hardware implementation, the elements used to perform pilot interpolation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the pilot interpolation techniques described herein may be implemented with modules (e.g., procedures, functions, and so on) that perform the functions described herein. The software codes may be stored in a memory unit (e.g., memory 152 in FIG. 1) and executed by a processor (e.g., controller 150). The memory unit may be implemented within the processor or external to the processor, in which case it can be communicatively coupled to the processor via various means as is known in the art.

For a hardware and software implementation, some parts of the pilot interpolation may be performed in hardware and some other parts may be performed in software. For example, referring back to FIG. 6, software codes may be used to provide the input control (block 612) and to generate the phase-rotated symbols (block 614), and the linear interpolator (block 616) and filter (block 618) may be implemented in hardware.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for deriving interpolated pilot symbols for a gated pilot in a wireless communication system, comprising:
    obtaining a first recovered pilot symbol for a first time instance and a second recovered pilot symbol for a second time instance;
    estimating a phase change induced in a received signal at a third time instance between the first and second time instances;
    deriving first and second phase-rotated symbols based on the first and second recovered pilot symbols and the estimated induced phase change;
    deriving interpolated pilot symbols between the first and third time instances based on the first recovered pilot symbol and the first phase-rotated symbol; and
    deriving interpolated pilot symbols between the third and second time instances based on the second phase-rotated symbol and the second recovered pilot symbol.

2. The method of claim 1, further comprising:
    deriving an interpolated pilot symbol at the third time instance based on the first and second recovered pilot symbols; and
    rotating the interpolated pilot symbol at the third time instance to derive the first and second phase-rotated symbols.

3. The method of claim 2, wherein the estimated induced phase change is apportioned to the first and second phase-rotated symbols based on the first, second, and third time instances.

4. The method of claim 1, wherein the first and second phase-rotated symbols are separated by the estimated induced phase change.

5. The method of claim 1, wherein the first and second recovered pilot symbols are derived based on pilot bursts received for the gated pilot.

6. The method of claim 1, further comprising:
    detecting a change in circuit settings in a received signal path, and wherein the estimated induced phase change is determined based on the detected change in circuit settings.

7. The method of claim 1, wherein the interpolated pilot symbols are derived based on interpolation.

8. The method of claim 1, wherein the interpolated pilot symbols are derived based on linear interpolation.

9. The method of claim 1, wherein the interpolated pilot symbols are derived based on cartesian interpolation.

10. The method of claim 1, wherein the interpolated pilot symbols are derived based on polar interpolation.

11. In a CDMA communication system employing a gated pilot transmission scheme, a method for deriving interpolated pilot symbols based on pilot bursts in a received signal, comprising:
    deriving first and second recovered pilot symbols based on pilot bursts received at first and second time instances, respectively;
    estimating a phase change induced in the received signal at a third time instance between the first and second time instances;
    deriving an interpolated pilot symbol at the third time instance based on the first and second recovered pilot symbols;

rotating the interpolated pilot symbol at the third time instance by the estimated induced phase change to derive first and second phase-rotated symbols;

deriving interpolated pilot symbols between the first and third time instances based on the first recovered pilot symbol and the first phase-rotated symbol and using linear interpolation; and deriving interpolated pilot symbols between the third and second time instances based on the second phase-rotated symbol and the second recovered pilot symbol and using linear interpolation.

12. A memory communicatively coupled to a digital signal processing device capable of interpreting digital information to:

obtain a first recovered pilot symbol for a first time instance and a second recovered pilot symbol for a second time instance derived based on pilot bursts received for a gated pilot;

estimate a phase change induced in a received signal at a third time instance between the first and second time instances;

derive first and second phase-rotated symbols based on the first and second recovered pilot symbols and the estimated induced phase change;

derive interpolated pilot symbols between the first and third time instances based on the first recovered pilot symbol and the first phase-rotated symbol; and derive interpolated pilot symbols between the third and second tine instances based on the second phase-rotated symbol and the second recovered pilot symbol.

13. The memory of claim 12, wherein the digital signal processing device is further capable of interpreting digital information to:

derive an interpolated pilot symbol at the third time instance based on the first and second recovered pilot symbols; and rotate the interpolated pilot symbol at the third time instance to derive the first and second phase-rotated symbols.

14. A computer program product for deriving interpolated pilot symbols for a gated pilot, comprising:

code for obtaining a first recovered pilot symbol for a first time instance and a second recovered pilot symbol for a second time instance;

code for estimating a phase change induced in a received signal at a third time instance between the first and second time instances;

code for deriving first and second phase-rotated symbols based on the first and second recovered pilot symbols and the estimated induced phase change;

code for deriving interpolated pilot symbols between the first and third time instances based on the first recovered pilot symbol and the first phase-rotated symbol;

code for deriving interpolated pilot symbols between the third and second time instances based on the second phase-rotated symbol and the second recovered pilot symbol; and a computer-usable medium for storing the codes.

15. A pilot processor for use in a wireless communication system, comprising:

a first unit operative to obtain a first recovered pilot symbol for a first time instance and a second recovered pilot symbol for a second time instance, wherein the first and second recovered pilot symbols are derived based on pilot bursts received for a gated pilot;

a symbol generator operative to derive first and second phase-rotated symbols based on the first and second recovered pilot symbols and an estimate of a phase change induced in a received signal at a third time instance between the first and second time instances; and an interpolator operative to derive interpolated pilot symbols between the first and third time instances based on the first recovered pilot symbol and the first phase-rotated symbol, and to derive interpolated pilot symbols between the third and second time instances based on the second phase-rotated symbol and the second recovered pilot symbol.

16. The pilot processor of claim 15, further comprising:

a filter operative to filter the interpolated pilot symbols to provide pilot estimates.

17. The pilot processor of claim 15, wherein the interpolator is operative to perform linear interpolation.

18. The pilot processor of claim 15, wherein the wireless communication system is an IS-856 CDMA communication system.

19. The pilot processor of claim 15, wherein the wireless communication system is a cdma2000 communication system.

20. The pilot processor of claim 15, wherein the wireless communication system is a W-CDMA communication system.

21. A rake receiver comprising a plurality of finger processors, each finger processor including a despreader operative to receive and despread data samples to provide despread samples;

a data decoverer operative to decover the despread samples with a first channelization code to provide data symbols;

a pilot decoverer operative to decover the despread samples with a second channelization code to provide recovered pilot symbols for pilot bursts received for a gated pilot;

a pilot processor operative to process the recovered pilot symbols to provide a reference signal having a phase that includes phase changes induced in a received signal; and a data demodulator operative to demodulate the data symbols with the reference signal to provide demodulated symbols, and wherein the pilot processor includes a first unit operative to obtain a first recovered pilot symbol for a first time instance and a second recovered pilot symbol for a second time instance, a symbol generator operative to derive first and second phase-rotated symbols based on the first and second recovered pilot symbols and an estimate of a phase change induced in the received signal at a third time instance between the first and second time instances, and an interpolator operative to derive interpolated pilot symbols between the first and third time instances based on the first recovered pilot symbol and the first phase-rotated symbol, and to derive interpolated pilot symbols between the third and second time instances based on the second phase-rotated symbol end the second recovered pilot symbol.

22. A rake receiver comprising a plurality of finger processors, each finger processor including a despreader operative to receive and despread data samples to provide despread samples;

a data decoverer operative to decover the despread samples with a first channelization code to provide data symbols;

a pilot decoverer operative to decover the despread samples with a second channelization code to provide recovered pilot symbols for pilot bursts received for a gated pilot;

a pilot processor operative to process the recovered pilot symbols to provide a reference signal having a phase that includes phase changes induced in a received signal; and a data demodulator operative to demodulate the data symbols with the reference signal to provide demodulated symbols, and wherein the interpolator is operative to derive the interpolated pilot symbols using linear interpolation.

23. A digital signal processor comprising:

a first unit operative to obtain a first recovered pilot symbol for a first time instance and a second recovered pilot symbol for a second time instance, wherein the first and second recovered pilot symbols are derived based on pilot bursts received for a gated pilot;

a symbol generator operative to derive first and second phase-rotated symbols based on the first and second recovered pilot symbols and an estimate of a phase change induced in a received signal at a third time instance between the first and second time instances; and an interpolator operative to derive interpolated pilot symbols between the first and third time instances based on the first recovered pilot symbol and the first phase-rotated symbol, and to derive interpolated pilot symbols between the third and second time instances based on the second phase-rotated symbol and the second recovered pilot symbol.

24. A receiver unit in a wireless communication system, comprising:

a receiver operative to process a received signal to provide data samples; and a rake receiver comprising a plurality of finger processors, each finger processor operative to process the data samples for a particular signal instance in the received signal to provide demodulated symbols for the signal instance, each finger processor including a despreader operative to receive and despread the data samples to provide despread samples, a data decoverer operative to decover the despread samples with a first channelization code to provide data symbols, a pilot decoverer operative to decover the despread samples with a second channelization code to provide recovered pilot symbols for pilot bursts received for a gated pilot, a pilot processor operative to process the recovered pilot symbols to provide a reference signal having a phase that includes phase changes induced in the received signal by circuit changes in the receiver, and a data demodulator operative to demodulate the data symbols with the reference signal to provide demodulated symbols.

25. The receiver unit of claim 24, further comprising:
a controller operative to provide an indication of circuit changes in the receiver.

26. The receiver unit of claim 24, further comprising:
a memory operative to store a table for a plurality of circuit settings for the receiver and associated phases.

27. The receiver unit of claim 24, wherein the pilot processor is further operative to derive interpolated pilot symbols.

28. A terminal in a wireless communication system, comprising:

a receiver operative to process a received signal to provide data samples; and a rake receiver comprising a plurality of finger processors, each finger processor operative to process the data samples for a particular signal instance in the received signal to provide demodulated symbols for the signal instance, each finger processor including a pilot processor operative to process recovered pilot symbols to provide a reference signal having a phase that includes phase changes induced in the received signal by circuit changes in the receiver, and wherein each finger processor is further operative to derive interpolated pilot symbols using linear interpolation.

29. A terminal in a wireless communication system, comprising:

a receiver operative to process a received signal to provide data samples; and a rake receiver comprising a plurality of finger processors, each finger processor operative to process the data samples for a particular signal instance in the received signal to provide demodulated symbols for the signal instance, each finger processor including a pilot processor operative to process recovered pilot symbols to provide a reference signal having a phase that includes phase changes induced in the received signal by circuit changes in the receiver, and wherein each finger processor is further operative to derive interpolated pilot symbols based on cartesian interpolation.

30. A terminal in a wireless communication system comprising:

a receiver operative to process a received signal to provide data samples; and a rake receiver comprising a plurality of finger processors, each finger processor operative to process the data samples for a particular signal instance in the received signal to provide demodulated symbols for the signal instance, each finger processor including a pilot processor operative to process recovered pilot symbols to provide a reference signal having a phase that includes phase changes induced in the received signal by circuit changes in the receiver, and wherein the wireless communication system is a CDMA system employing a gated pilot transmission scheme.

31. An apparatus in a wireless communication system, comprising:

means for obtaining a first recovered pilot symbol for a first time instance and a second recovered pilot symbol for a second time instance, wherein the first and second recovered pilot symbols are derived based on pilot bursts for a gated pilot;

means for estimating a phase change induced in a received signal at a third time instance between the first and second time instances;

means for deriving first and second phase-rotated symbols based on the first and second recovered pilot symbols and the estimated induced phase change;

means for deriving interpolated pilot symbols between the first and third time instances based on the first recovered pilot symbol and the first phase-rotated symbol; and means for deriving interpolated pilot symbols between the third and second time instances based on the second phase-rotated symbol and the second recovered pilot symbol.

32. The apparatus of claim 31, further comprising:
means for deriving an interpolated pilot symbol at the third time instance based on the first and second recovered pilot symbols; and means for rotating the interpolated pilot symbol at the third time instance to derive the first and second phase-rotated symbols.

33. The apparatus of claim 31, wherein the interpolated pilot symbols are derived using linear interpolation.

* * * * *

UNITED STATES PATENT AND TRADEMARK OFFICE
CERTIFICATE OF CORRECTION

PATENT NO.        : 7,133,437 B2
APPLICATION NO. : 10/061824
DATED             : November 7, 2006
INVENTOR(S)       : Peter J. Black and Raghu Challa It is certified that error appears in the above-identified patent and that said Letters Patent is hereby corrected as shown below:

Col. 4 Line 52
should read --Within each assigned finger processor 210n, a resampler/...--

Signed and Sealed this

Sixth Day of March, 2007

JON W. DUDAS
*Director of the United States Patent and Trademark Office*